United States Patent

Stanley

[11] 4,040,689
[45] Aug. 9, 1977

[54] ANTIFRICTION ROLLER BEARING

[76] Inventor: Richard B. Stanley, 17763 G Drive North, Marshall, Mich. 49068

[21] Appl. No.: 649,694

[22] Filed: Jan. 16, 1976

Related U.S. Application Data

[63] Continuation-in-part of Ser. No. 449,699, March 11, 1974, Pat. No. 3,963,286.

[51] Int. Cl.$^2$ .............................................. F16C 13/00
[52] U.S. Cl. .................................................... 308/205
[58] Field of Search ............ 308/202, 205, 174, 207 R

[56] References Cited

U.S. PATENT DOCUMENTS

| | | | |
|---|---|---|---|
| 1,917,452 | 7/1933 | Lott | 308/215 |
| 2,251,555 | 8/1941 | Schermer | 308/215 |
| 2,266,888 | 12/1941 | McCurdy et al. | 308/205 |
| 2,683,379 | 7/1954 | Strandgren | 308/215 |
| 3,301,615 | 1/1967 | Brady | 308/215 |

*Primary Examiner*—Joseph E. Peters, Jr.
*Assistant Examiner*—Richard A. Bertsch
*Attorney, Agent, or Firm*—McWilliams & Mann

[57] ABSTRACT

An antifriction roller bearing having a bearing assembly comprising an outer race, an inner race, and rolling bearings interposed between said races, in which assembly the rolling bearings each comprise a roller having its ends in thrust load transmitting engagement with the outer race, which rollers are also in thrust and load transmitting relation to the inner race intermediate the ends of said rollers by way of right grooves and flanges formed in both the rollers and inner race, which are in substantially complemental interfitting relation. The area of engagement of said rollers with said inner race at least equals the area of engagement of said rollers with the outer race. The rollers have their thrust transmitting surfaces that engage corresponding surfaces of the outer race, and their thrust transmitting surfaces that engage corresponding surfaces of the inner race, angled with respect to the longitudinal axes of the respective rollers. Canting of the rollers is avoided by making the angulation of the roller surfaces that engage the outer race greater than the angulation of the roller surfaces engaging the inner race.

12 Claims, 6 Drawing Figures

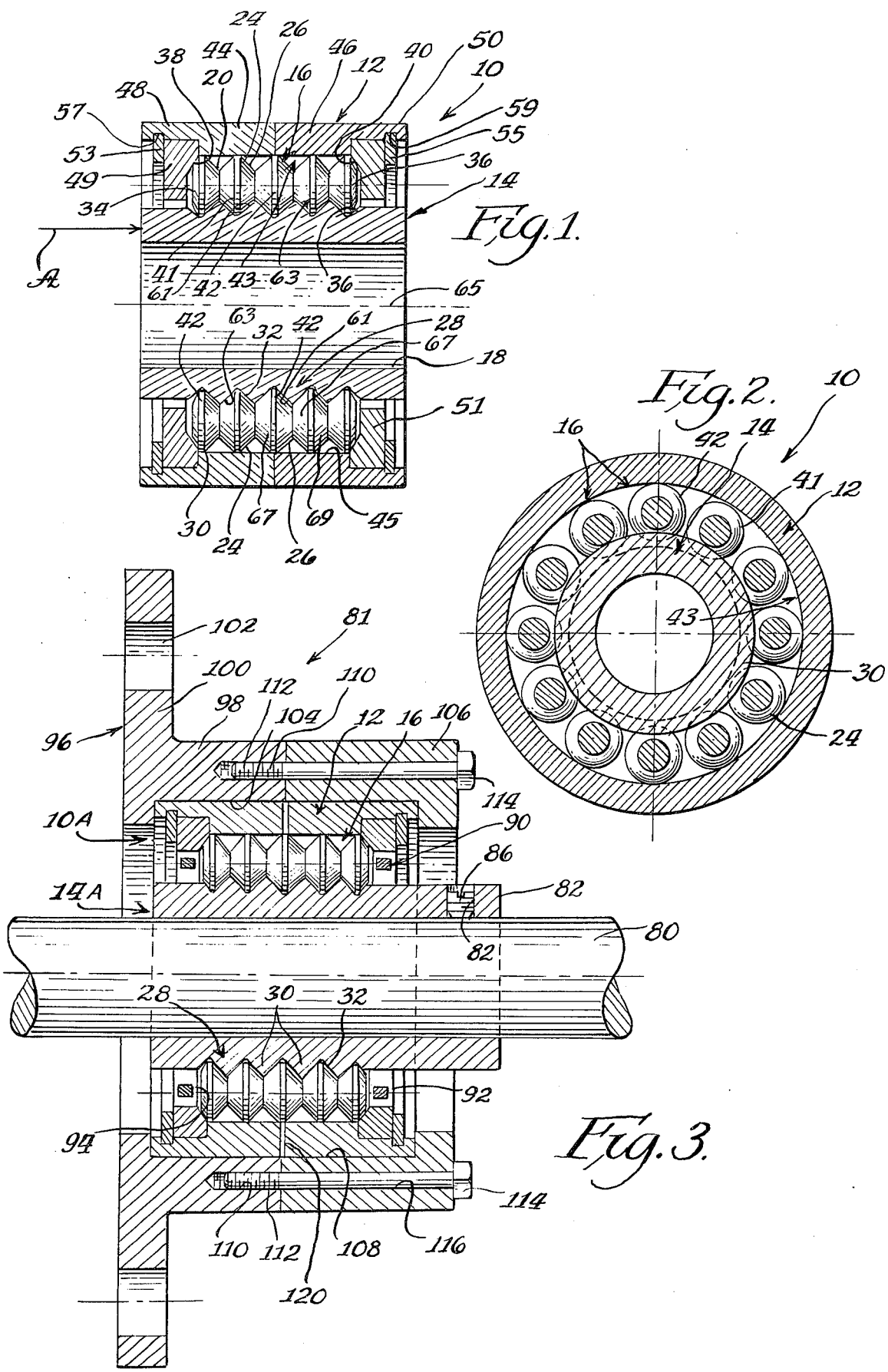

ANTIFRICTION ROLLER BEARING sp

This application is a continuation-in-part of my application Ser. No. 449,699, filed Mar. 11, 1974 now U.S. Pat. No. 3,963,286.

This invention relates to antifriction bearings, and more particularly to antifriction bearings of the roller bearing type adapted to handle both radial and thrust loads.

Conventional bearings of the ball and roller type individually have the well known inherent limitation in the loads they will carry due to the point or line contact the rolling elements involved have with the bearing raceway surfaces. However, the applicant's analysis of bearing load limitation have made it evident that there is another important load limiting factor that apparently has not been considered in bearing design. This is that the bearing assembly about its outer diameter (the lucus of the points or lines of engagement of the rolling bearings with the bearing outer race) can withstand and transmit 15 to 20 times more unit pressure than at the internal diameter of the bearing (the lucus of the points or lines of engagement of the rolling bearing with the bearing inner race). This is because in the case of the outer diameter of the bearing, convex surfaces of the rolling bearings are rolling on a concave raceway surface, which in practice adds up to a significantly greater area of contact than at the inner diameter of the bearing, where convex surfaces of the rollers are riding on a convex inner raceway surface.

In the case of roller bearings, canting of the rollers relative to their raceways has been found to be a source of operating inefficiency; it is a particular problem in those types of bearings where the rollers are not journalled in their operating positions, as in spacers or the like.

A principal object of this invention is to provide an antifriction roller bearing assembly of a significantly increased capacity by arranging it so that the area of engagement between the rolling bearings and the inner race is equal to that of the rolling bearings with the bearing unit outer race and that canting tendencies of the rollers even if unjournalled are overcome.

Another principal object of the invention is to provide a roller bearing adapted to handle thrust loads in either direction while requiring only a single row of bearing rollers about the inner race.

Other important objects of the invention are to provide a roller bearing inner and outer race assembly that has low coefficient friction characteristics, that is of few and simple parts, and that is economical of manufacture, convenient to assemble and install, and long lived in operation.

In accordance with the invention, a roller bearing inner and outer race assembly is provided in which a single row of rollers having their shanks formed with alternating right flanges and grooves riding on an inner raceway surface of like contour, with the ends of the rollers being formed with thrust surfaces that are angled relative to the longitudinal axes of the rollers, for riding on correspondingly contoured raceway surfaces on the outer race. The area of engagement of the rollers with the inner raceway is made at least equal to the engagement of the rollers with the outer raceways. The flanges and grooves of the rollers and inner raceway are 45° angled for optimum load transmittal characteristics.

Canting of the rollers is avoided by making the angulation of the roller outer race engaging thrust transmitting surfaces greater than the roller inner race engaging thrust transmitting surfaces. For instance, where the roller-inner race engaging flanges and grooves are of the indicated 45° angle configuration, the angling of the roller-outer race engaging thrust transmitting surfaces should be in the range of 46°–90° (with respect to the longitudinal axis of the respective rollers). The bearing also is arranged to have roller-outer race radial load transmitting surfaces, whereby, when thrust loads are applied to the bearing, sufficient radial loads act on the rollers to overcome canting tendencies.

The result is that the basic weakness of conventional roller bearing units is overcome by increasing the area of engagement of the rollers and the inner race about the inner diameter of the bearing to at least equalization with the area of engagement of the rollers and the outer race about the outer diameter of the bearing. Furthermore, thrust loads acting in either direction can be handled by the bearing assembly utilizing a single row of rollers, and canting tendencies of the rollers are overcome to minimize the frictional resistance of the bearing.

Other objects, uses and advantages will be obvious or become apparent from a consideration of the following detailed description and the application drawings, wherein like reference numerals indicate like parts throughout the several views.

In the drawings:

FIG. 1 is a diagrammatic sectional view along the axial center of a diagrammatically illustrated bearing assembly illustrating the basic features of this invention;

FIG. 2 is a sectional view taken substantially along line 2—2 of FIG. 1;

FIG. 3 illustrates a flange type bearing unit employing the principles of this invention;

Figure 4:
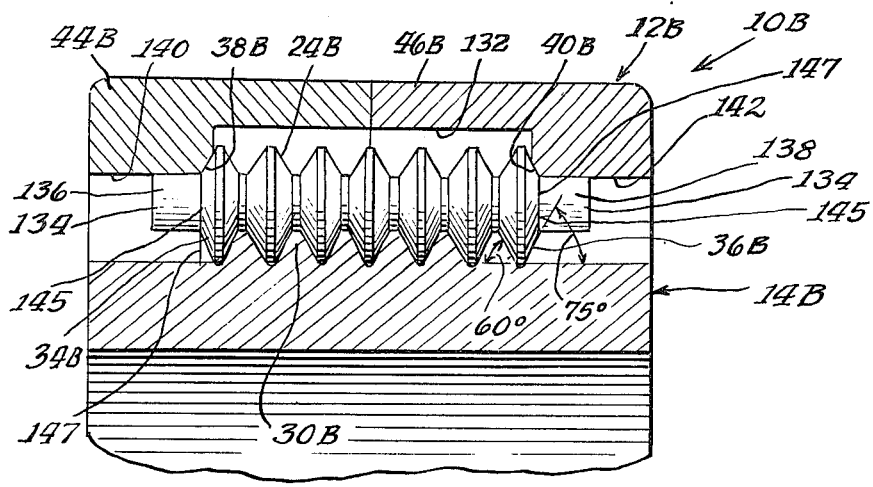
FIG. 4 is a fragmental view similar to that of FIG. 1, but illustrating a modified embodiment.

However, it is to be distinctly understood that the specific drawing illustrations provided are supplied primarily to comply with the requirements of the Patent Laws, and that the invention is susceptible of other embodiments that are intended to be covered by the appended claims.

Referring first to the diagrammatic illustrations of FIGS. 1 and 2, reference numeral 10 generally illustrates a largely diagrammatically illustrated bearing assembly of the roller type in which the basic features of this invention are incorporated, wherein it is shown that the basic bearing assembly of this invention comprises an outer race 12, an inner race 14, and rollers 16 interposed between the inner and outer races.

The inner race is of the usual annular construction, defining bore 18 that receives the shaft to which the inner race is applied. Details such as roller spacers, seals, and devices for locking the inner race to the shaft are omitted for simplicity of illustration insofar as diagrammatic FIGS. 1 and 2 are concerned. However, the rollers should be free of journalling at their ends.

In accordance with this invention, the area of engagement of the rollers 16 with the inner race is at least equal to the area of engagement of the rollers with the outer race.

This is achieved, in accordance with this invention, by forming the shank 20 of the individual rollers 16, intermediate the ends 22 of the rollers, with alternating right flanges 24 and right grooves 26 which ride on annular raceway 28 that is of like contour. That is, the inner race raceway also defines alternating right flanges 30 and right grooves 32 about the external diameter of the inner race. These flanges and grooves are disposed at right angles to the longitudinal axes of the respective rollers and inner race, and thus are appropriately termed "right" in character.

As indicated in FIG. 1, in the form shown, the grooves and flanges of the rollers and inner race are substantially complemental in configuration, and are shaped and angled in the preferred embodiments at 45° in a manner similar to 45° angle screw threading of the standard V type.

Furthermore, the ends 22 and 23 of the rollers are free of end journalling and are formed with frusto-conical thrust transmitting bearing surfaces 34 and 36 that ride on corresponding contoured raceway surfaces 38 and 40 of the outer race in a complemental self centering manner, with the outer race surfaces 38 and 40 thus defining the thrust transmitting portions of the outer race raceway in spaced apart sections. The roller flanges of bearing assembly 10 at their rims 41 are shaped to define cylindrical radial bearing surfaces 42 that ride on the outer race radial force receiving raceway 43 defining cylindrical raceway surface 45.

In the form shown, the outer race 12 is of two part construction, comprising a pair of ring sections or members 44 and 46 that are respectively flanged at 48 and 50 to receive the respective thrust rings 49 and 51 in which the respective thrust transmitting surfaces 38 and 40 are formed. Rings 49 and 51 are held in place by the respective suitable lock rings 53 and 55 seated in the respective grooves 57 and 59.

In the diagrammatic form shown in FIGS. 1 and 2, sufficient rollers 16 are employed to substantially fill the space between the inner and outer races between these two components with a single row of the bearing elements 16, with no spacer component being employed. However, this is optional, as where strict spacing between rollers are desired, a conventional roller spacer, shaped to accommodate the special shaping of the rollers 16, may be employed; in any event, journalling of the individual rollers at their ends or elsewhere, in the spacer or other similar device employed is to be avoided as it is an important aspect of the invention that the loads applied through the rollers act at the rollers bearing surfaces at its flanges and unjournalled shank ends. The rollers 16 should also be free of geared interconnection with either inner race 14 or outer race 12.

As indicated, the area of engagement of the rollers 16 with the inner race, about the raceway 28, which thus forms the inner or internal diameter of the bearing, is made at least equal to the area of engagement between the rollers 16 and the outer raceway surfaces 38 and 40, which gives the bearing assembly 10 a unit pressure load capacity at its inner diameter which is at least equal to that at its outer diameter, thereby significantly increasing the load bearing capacity of the bearing assembly 10. This is done by appropriately proportioning the sizing of the roller and inner race flanges and grooves relative to the areas of roller engagement with outer race raceways 38, 40 and 43.

Furthermore, the oblique positioning of the roller bearing surfaces 34 and 36 and the outer raceway surfaces 38 and 40 with which they cooperate, relative to the longitudinal axes of the rollers, and the flanged nature of the rollers 16 and inner raceway 28, enable the bearing unit to take thrust loads acting in either direction. It will also be apparent that only a single row of the unjournalled rollers 16 is required for this purpose.

The 45° angulation of the flanges and grooves of the rollers 16 and inner raceway 28 provides for equal application of the components of thrust loads radially and longitudinally of the bearing, from either side of the bearing.

In the assembled relation of the bearing 10, the rollers 16 have their flanges and grooves 24 and 26 in rolling relation with the flanges and grooves 30 and 32 of the inner race 14, and rollers 16 have their shanks in rolling relation with the respective raceways surfaces 38 and 40 of the outer race 12. Roller flange radial load surfaces 42 ride on raceway surface 45.

It will be observed, as indicated, that the thrust bearing surfaces 34 and 36 of the rollers 16 and the raceway surfaces 38 and 40 are of complementary frusto-conical configuration and are angled relative to the longitudinal axes of the respective rollers 16. The shaping of these surfaces is in a complemental self centering manner.

Also, the flanges 30 of inner race 14 define on either side of same a pair of frusto-conical thrust transmitting surfaces or faces 61 and 63 which are operably associated with the flanges 24 of the respective rollers 16. The flanges 24 of the rollers 36 are formed to have a cross sectional shaping, longitudinally of the respective rollers 16, that complements the cross sectional shaping of the inner race flanges 30 longitudinally of the bearing axis 65. Thus, the flanges 24 also each define on either side of same a pair of frusto-conical thrust transmitting surfaces or faces 67 and 69 which cooperate with the respective, substantially complementary surfaces or faces 61 and 63 of the inner face flanges 30.

In accordance with the present invention, the angulation of the roller thrust bearing surfaces 34 and 36 is so related to the angulation of the thrust transmitting surfaces or surfaces 67 and 69 of the respective rollers 16 such that the rollers 16 are biased, by radial loads applied to same, against tendencies to cant, when thrust loads are acting through the rollers 16, either by having same applied thereto through race rings 49 and 51, or by having same applied thereto through the inner race flanges 30 acting on the surfaces 67 and 69 of the roller flanges 24.

More specifically, the invention contemplates that the angulation of the roller thrust bearing surfaces 34 and 36 (and the thrust resisting surfaces they engage), with respect to the longitudinal axes of the respective rollers, will exceed that of the angulation of the roller flange sufaces 67 and 69 (and the thrust surfaces they engage), with respect to the individual roller longitudinal axes. It has been found that so long as this relationship is observed, application of thrust forces to the rollers 16 results in an application of sufficient radial force to same to sufficiently radially load the roller surfaces 42 against raceway surface 45, to resist tendencies of the rollers 16 to cant to one side or the other of substantial parallelism with bearing axis 65. This is achieved by an outward camming action of the inner race flanges 30 on the roller flanges 24 that obtains when the roller flange and radial and thrust bearing surfaces have the relationships indicated.

Another way of stating the relationship of the angulation of the roller bearing surfaces to the angulation of the roller flange thrust surfaces 67 and 69 is that the angle of departure of surfaces 34 and 36 from right angle positioning with respect to the longitudinal axis of the respective rollers should be less than the corresponding angulation of surfaces 67 and 69 relative to the roller longitudinal axis.

As an example, since the surfaces 61 and 63 are at 45° angles with respect to the longitudinal axes of the respective rollers 16, the surfaces 34 and 36 of the respective rollers 16, and the raceway surfaces 38 and 40 they cooperate with should be angled at least 46° and up to a maximum of 90°, with respect to the said longitudinal axes of the respective rollers 16. In a preferred embodiment of the invention, the surfaces 34 and 36 are angled at approximately 75° with respect to the longitudinal axes of the respective rollers 16.

For this arrangement, a thrust force acting on the inner race 14 in the direction A (assuming race 14 is keyed to a shaft and the outer race is keyed to a fixed object), results in thrust surface 40 applying approximately five percent of the A force against the adjacent ends of the rollers 16. However, the rollers in being also acted on by the aforeindicated radial force, can resist canting up to twenty-five percent of the A force.

As a further example of thrust surfacing angulation in accordance with the invention, flanges 24 and 30 may be shaped so that the surfaces 61, 63, 67 and 69 will have an angulation of 60° with respect to the roller longitudinal axes. For this variation of the invention, the angulation of the thrust resisting surfaces 34 and 36 with respect to the longitudinal axes of the respective rollers 16 should be at least 61° and up to a maximum of 90°. An angulation of 75° is preferred for such an alternate embodiment.

Assembly of the bearing assembly 10 is simple; it requires application of one of the outer race sections 44 or 46 (having the indicated race and lock rings applied thereto) about the inner race 14, with the individual rollers 16 then being applied therebetween, and the second outer race section (with its race and lock rings applied thereto) slipped into place over the protruding ends of rollers 16. Outer race sections 44 and 46 then may be suitably secured together, as by employing suitable fastening devices, such as screws, external clamps, or the like, or the mounting of the bearing assembly 10 in its housing, such as those suggested in FIG. 3, will serve this purpose. The inner race 14 may be arranged for keying or coupling to a shaft using any of the conventional means for doing this such as the various types of set screw, clamping, cam locking, and other arrangements found in commercially available bearings used for shaft journalling or mounting purposes.

While outer race 12 is shown round in external configuration in the drawings, it may be of quadrilateral external shape, though the internal surfacing of same will be round as indicated in the drawing.

Referring now to the bearing unit 81 of FIG. 3, which diagrammatically illustrates the application of the principles of this invention to a flange type bearing unit, the inner race 14A of bearing assembly 10A is shown applied to a shaft 80 and has one end of same extended as at 82 and formed with a threaded opening 84 that receives set screw 86 which is turned into engagement with the shaft 80 for fixing the inner race 14A to the shaft 80.

The inner race 14A is formed with raceway 28, including its right flanges 30 and right grooves 32. The outer race 12 is the same as shown in FIG. 1 and the outer and inner races have the rollers 16 interposed therebetween in a manner indicated in FIG. 1, except that in the case of the bearing unit 10A, a roller spacer 90 is employed that is of a more or less conventional non-roller journalling arrangement, and comprises a ring 92 formed to define roller receiving openings 94 therein that receive the respective rollers 16 for spacing them as desired about the inner race 14A.

The bearing assembly 10A is mounted in flange type bearing housing 96, to complete the bearing unit 81. The housing 96 comprises a base portion 98 that is flanged as at 100 for formation of the usual bolt receiving holes 102, and that is socketed as at 104 to receive the bearing assembly 10A.

The flange type housing 96 also includes a cover portion 106 that is socketed as at 108 to receive the bearing assembly 10A. The housing base portion 96 is formed with threaded openings 110 to receive the threaded ends 112 of suitable bolts 114 applied to the corresponding bolt receiving openings 116 of the housing cover portion 96 for securing the bearing assembly 10A within the housing 96.

In practice, the outer race sections 44 and 46 may be so formed that when the outer raceway surfaces 38 and 40 are firmly seated against the bearing surfaces 34 and 36 of the rollers 16, the outer race sections 44 and 46 are slightly spaced apart, as indicated at 120 in FIG. 3. This is to insure that the outer raceway surfaces 38 and 40 are firmly seated against the bearing surfaces 34 and 36 of the rollers for good force transmitting relation thereto.

The bearing unit 81 may be employed to mount shaft 60 in conventional flange type mounting arrangements. Similarly, bearing assembly 10 may be employed in pillow block and other conventional styles of bearing arrangements. An example of a pillow block arrangement suitable for practice of the invention is shown in FIG. 4 of my said application (the disclosure of which is hereby incorporated herein by this reference). Of course, suitable seals and the like may be employed as desired.

Figure 5:
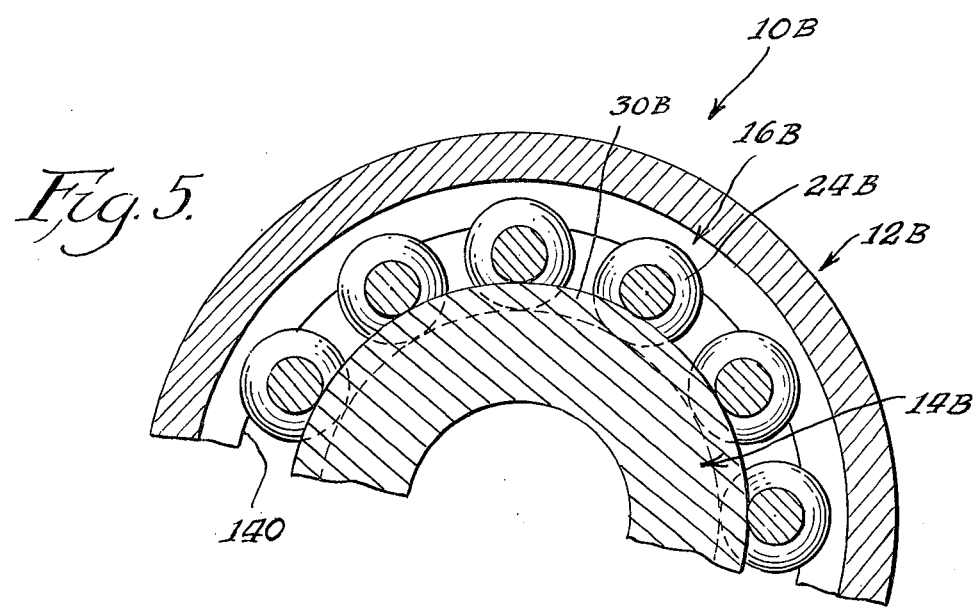
FIG. 5 is a view similar to that of FIG. 1, but illustrating the form of FIG. 4; and, FIG. 6 is a view similar to that of FIG. 4, but illustrating a further form of the invention.
Figure 6:
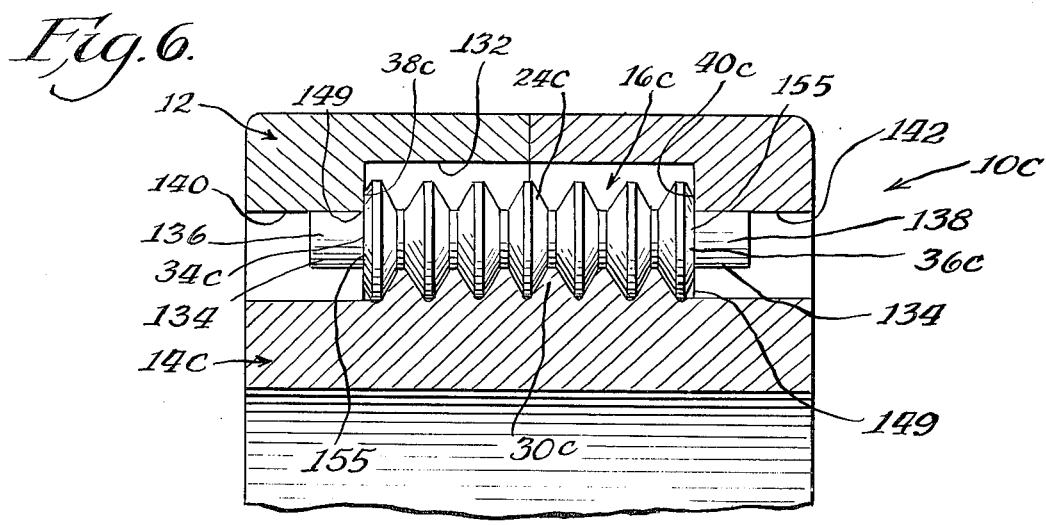

In the embodiment 10B of FIGS. 4 and 5, the flanges 24B have 60° angulation relative to the longitudinal axes of the rollers 16B, and inner face flanges 30B are similarly contoured. The outer race 12B is shaped to dispose its surfacing 132 out of contact with the roller flanges 24B, and instead rollers 16B have end extensions 134 defining the respective radial load surfaces 136 and 138 that ride on the outer race radial load surfaces 140 and 142, respectively. The roller thrust surfaces 34B and 36B ride on outer race thrust surfaces 38B and 40B, which are angled at 75° with respect to the longitudinal axes of the respective rollers, whereby the roller anticanting action of this invention is provided.

The bearing assembly 10B may otherwise be arranged for practical use in the same manner as described in connection with assembly 10, outer race sections 44B and 46B being held together in any suitable manner.

In the embodiment 10C of FIG. 5, the bearing assembly is the same as assembly 10B except that the roller thrust surfaces 34C and 36C are angled at 90° relative to the longitudinal axes of the respective rollers 16C, and the outer race thrust surfaces 38C and 40C are similarly angled.

In the bearing assemblies 10B and 10C, the roller end thrust transmitting surfaces 34B, 34C, 36B and 36C, and their respectively adjacent radial load surfaces 136 and 138 merge at a roller encircling corner, for instance corner 145 for unit 130 and corner 155 for unit 150. The corresponding contoured surfaces 38B, 38C, 40B, 40C, 140 and 142 of the outer race are similarly arranged, they merging into encircling corners 147 and 149, respectively. With this relationship of parts the roller extensions 134 may be appropriately proportioned for having their radial load surfaces 136 and 138 in rolling engagement with the outer race radial load surfaces 140 and 142 respectively, and by making the flange thrust surfaces 61, 63, 67 and 69 within acceptable tolerance ranges, the outer race thrust surfaces may be pressed into rolling engagement with the respective roller end thrust surfaces, by appropriately preloading the outer race sections 44 and 46 toward each other (assuming the slight separation 120 of FIG. 3). The roller and outer race thrust and radial surfaces involved are thus composite thrust and radial force transmitting surfaces of complemental nature.

Of course, the bearing assembly outer race may be of one piece construction, as disclosed in my said application.

It will therefore be seen that the invention of this application provides a bearing unit in which the unit pressures applicable to the bearing internal diameter are at least equalized with those applied to the outer diameter, thereby significantly increasing the load bearing capacity of the bearing unit.

The 45° angulation of the roller and inner race flanges and grooves is the optimum angle for advantageous application of thrust forces to the bearing. At this angle, thrust forces are equally divided between laterally and radially acting components for uniform stress application to the bearing.

The shaping of the roller and outer race radial load and thrust surfaces indicated, relative to the angulation of the roller flange thrust surfaces results in the application to the rollers of sufficient radial force (under thrust loads acting on the bearing) to hold the rollers against canting against forces tending to result in canting up to 25 percent of the thrust loads involved.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a rolling bearing assembly defining a bearing axis and including an inner race, an outer race disposed about the inner race and concentric with the bearing axis, and a plurality of rolling bearing interposed between the inner and outer races, with the rolling bearings each comprising an elongate roller defining a shank intermediate the ends thereof, the improvement wherein:

the inner race is formed to define an inner raceway thereabout, said inner raceway and said shanks of said rollers being formed to define right flanges and right grooves in substantially complementing interfitting relation forming the areas of rolling engagement of the rollers with the inner race raceway, said rollers each defining a thrust bearing surface at either end of same that is angled relative to the longitudinal axis of the respective rollers, and radial load transmitting surfacing in circumambient relation about the respective rollers, said areas of flanges and grooves of said roller shanks forming a plurality of thrust transmitting faces that are angled relative to the longitudinal axis of the respective rollers, said outer race defining outer raceway surfaces thereabout on which said roller surfaces and surfacing respectively ride in rolling engagement therewith, with said roller bearing surface angulation being greater than said thrust transmitting face angulation.

2. The improvement set forth in claim 1 wherein:
   the area of engagement of said rollers with said inner race at said inner raceway is at least equal to the area of engagement of said rollers with said outer race outer raceway surfaces.

3. The improvement set forth in claim 1 wherein:
   said roller radial load surfacing comprises a plurality of radial surfaces formed by said roller flanges.

4. The improvement set forth in claim 3 wherein:
   said roller radial surfaces are intermediate said roller ends.

5. The improvement set forth in claim 1 wherein:
   said roller radial load surfacing comprises for each roller a radial load transmitting surface at either end of same that is adjacent the thrust transmitting surface thereof.

6. The improvement set forth in claim 5 wherein:
   said roller flanges are free of engagement with said outer race.

7. The improvement set forth in claim 1 wherein:
   said roller flanges are of 45° angle V configuration, with said roller surface angulation being in the range of 46°–90°.

8. In a rolling bearing assembly defining a bearing axis and including an inner race, an outer race disposed about the inner race and concentric with the bearing axis, and a plurality of rolling bearings interposed between the inner and outer races, with the rolling bearings each comprising an elongate roller defining a shank intermediate the ends thereof, the improvement wherein:

the inner race is formed to define an inner raceway thereabout, said inner raceway and said shanks of said rollers being formed to define right flanges and right grooves in substantially complementing interfitting relation forming the area of rolling engagement of the rollers with the inner race raceway, said rollers each defining a thrust bearing surface at either end of the same that is angled relative to the longitudinal axis of the respective rollers, and radial load transmitting surfacing in circumambient relation about the respective rollers, said areas of said flanges and grooves of said roller shanks forming a plurality of thrust transmitting faces that are angled relative to the longitudinal axis of the respective rollers, said outer race defining an outer raceway surface thereabout on which said roller surfaces and surfacing respectively ride in rolling engagement therewith, with those of said outer race surfaces on which said roller thrust bearing surfaces ride being aligned therewith transversely of the bearing assembly, and with said outer raceway intermediate the ends of said rollers being a surface of revolutions that is smoothly contoured axially of the bearing assembly, said roller bearing surface angulation being greater than said thrust transmitting face angulation.

9. In a rolling bearing unit defining a bearing axis and including an inner race, an outer race disposed about the inner race and concentric with the bearing axis, and rolling bearings interposed between said races in load transmitting relation thereto, the improvement comprising:

said outer race defining a raceway thereabout having a pair of thrust resisting surfaces spaced apart axially of said bearing, said rolling elements each comprising a roller having a shank defining adjacent either end of same a thrust bearing surface that is angled relative to the axis of the roller, which bearing surfaces of the respective rollers ride on the respective outer raceway surfaces in substantially complementing, force transmitting relation thereto, said outer race thrust resisting surfaces being of circular contour transversely of the bearing axis and across the area of same that is engaged by said rollers, with said areas of said outer race thrust resisting surfaces each being a surface of revolution that is smoothly contoured axially of the bearing assembly, said inner race being formed to define a raceway thereabout, said inner race raceway and said rollers intermediate said roller ends being formed to define right flanges and right grooves in substantially complementing interfitting relation forming the areas of rolling engagement of the rollers with the inner race raceway, said rollers and said outer race defining radial load transmitting surfacing in which the roller surfacing thereof is in rolling engagement with the outer race surfacing thereof, said areas of said flanges and grooves of said roller shanks forming a plurality of thrust transmitting faces that are angled relative to the longitudinal axis of the respective rollers, with said roller bearing surface angulation being greater than said thrust transmitting face angulation.

10. The improvement set forth in claim 9 wherein:

said rollers are each of one piece construction and form a single row of rolling bearings about said inner race between said outer race surfaces, with said rollers being free of geared interconnection with said races and each other.

11. The improvement set forth in claim 9 wherein:

said flanges and grooves are in alternating relation axially of the baring assembly.

12. The improvement set forth in claim 9 wherein:

said thrust transmitting and radial load surfaces of said rollers at either end of same are contiguous and merge into each other at circumambient corners to form a composite thrust-radial load surfacing at either end of said rollers.

* * * * *